United States Patent [19]

Veraart

[11] Patent Number: 5,116,002
[45] Date of Patent: May 26, 1992

[54] STOPPING ZONES IN A LINEAR MOTOR IN-TRACK TRANSIT SYSTEM

[75] Inventor: Pierre Veraart, Kingston, Canada

[73] Assignee: UTDC, Inc., Canada

[21] Appl. No.: 548,248

[22] Filed: Jul. 5, 1990

[51] Int. Cl.⁵ .................. B61L 3/04; B61L 3/22; B61L 13/06
[52] U.S. Cl. .................. 246/187 R; 246/187 B; 104/292; 104/295
[58] Field of Search ............. 188/164, 165; 104/281, 104/282, 290, 292, 295, 298; 246/31, 63 R, 63 C, 63 A, 182 R, 187 R, 187 A, 187 B; 191/10

[56] References Cited

U.S. PATENT DOCUMENTS

| | | | |
|---|---|---|---|
| 3,506,862 | 4/1970 | Nomura | 310/93 |
| 3,540,541 | 11/1970 | Hayes | 246/29 RX |
| 3,691,368 | 9/1972 | Hoyler | 246/63 AX |
| 3,736,880 | 6/1973 | Ross | 104/148 MS |
| 3,768,417 | 10/1973 | Thornton et al. | 104/298 X |
| 3,774,025 | 11/1973 | Auer, Jr. et al. | 246/63 A |
| 3,803,466 | 4/1974 | Starkey | 318/135 |
| 3,827,371 | 8/1974 | Onoda | 104/148 |
| 3,828,236 | 8/1974 | Close | 246/187 BX |
| 3,847,089 | 11/1974 | Nelson | 104/292 X |
| 3,848,836 | 11/1974 | Wallgard et al. | 246/63 R |
| 3,874,301 | 4/1975 | Alimanestianu | 104/298 |
| 3,880,088 | 4/1975 | Grant | 104/168 |
| 3,904,942 | 9/1975 | Holtz | 318/135 |
| 3,934,183 | 1/1976 | Saufferer | 104/294 X |
| 3,937,431 | 2/1976 | Guntner | 246/182 B |
| 3,967,801 | 7/1976 | Baughman | 246/34 R |
| 3,974,778 | 8/1976 | Black et al. | 104/148 LM |
| 3,979,092 | 9/1976 | Perry et al. | 246/187 BX |
| 4,014,503 | 3/1977 | Raimer | 246/63 CX |
| 4,061,089 | 12/1977 | Sawyer | 104/23 FS |
| 4,068,152 | 1/1978 | Nakamura et al. | 104/298 X |
| 4,142,700 | 3/1979 | Ubel | 246/182 CX |
| 4,166,599 | 9/1979 | Auer, Jr. et al. | 246/63 A |

(List continue on next page.)

OTHER PUBLICATIONS

Patent Abstracts of Japan, vol. 5, No. 163 (E-78) (835), Oct. 20, 1981.
Patent Abstracts of Japan, vol. 10, No. 105 (M-471) (2162), Apr. 19, 1986.
Patent Abstracts of Japan, vol. 9, No. 110 (E-314) (1833), May 15, 1985.

*Primary Examiner*—Frank E. Werner
*Assistant Examiner*—Scott L. Lowe
*Attorney, Agent, or Firm*—James A. Drobile; Robert E. Rosenthal

[57] ABSTRACT

Stopping zones in a linear motor in-track transit system are provided. The transit system includes a guideway and at least one vehicle moveable along the guideway between freight loading and unloading stations. Stopping zones are designated at certain segments of the guideway where it is necessary to stop a vehicle. The stopping zones include a primary brake in the form of a linear motor primary which is operable under normal conditions to stop the vehicle in the stopping zone at a designated stopping point when the vehicle enters the stopping zone. The linear motor primary is also operable to restart a vehicle it has stopped. A secondary brake is also provided along the guideway within the stopping zone and is spaced from the primary brake. The secondary brake typically remains inoperative but is also capable of stopping a vehicle within the stopping zone when the vehicle travels beyond the designated stopping point due to failure or malfunction of the primary brake. Preferably, a restart device in the form of a second linear motor primary is also provided adjacent the secondary brake to restart a vehicle stopped by the secondary brake.

20 Claims, 6 Drawing Sheets

U.S. PATENT DOCUMENTS

| | | | |
|---|---|---|---|
| 4,305,485 | 12/1981 | Dubreucq | 188/164 |
| 4,348,618 | 9/1982 | Nakamura et al. | 246/187 B X |
| 4,381,478 | 4/1983 | Saijo et al. | 246/182 CX |
| 4,471,356 | 9/1984 | Gidl | 246/63 RX |
| 4,651,071 | 3/1987 | Imanaka | 318/371 |
| 4,652,800 | 3/1987 | Fukuwatari | 318/135 |
| 4,665,349 | 5/1987 | Matsuo | 318/135 |
| 4,690,066 | 9/1987 | Morishita et al. | 104/282 |
| 4,700,119 | 10/1987 | Karita | 318/587 |
| 4,709,639 | 12/1987 | Geais | 104/292 |
| 4,716,346 | 12/1987 | Matsuo | 318/38 |
| 4,718,621 | 1/1988 | Horinouchi et al. | 104/292 X |
| 4,721,045 | 1/1988 | Okawa et al. | 104/290 |
| 4,721,892 | 1/1988 | Nakamura et al. | 318/38 |
| 4,800,818 | 1/1989 | Kawaguchi et al. | 104/290 |
| 4,819,564 | 4/1989 | Brandis et al. | 104/292 |
| 4,836,344 | 6/1989 | Bolger | 191/10 |
| 4,853,602 | 8/1989 | Hommes et al. | 318/38 |
| 4,931,677 | 6/1990 | Heidelberg et al. | 104/292 X |
| 4,991,514 | 2/1991 | Powell et al. | 104/292 X |
| 4,993,327 | 2/1991 | Labarre et al. | 104/290 |

FOREIGN PATENT DOCUMENTS

| | | | |
|---|---|---|---|
| 0158114 | 10/1985 | European Pat. Off. | |
| 0160523 | 11/1985 | European Pat. Off. | |
| 278532 | 8/1988 | European Pat. Off. | |
| 2257773 | 5/1974 | Fed. Rep. of Germany | 104/282 |
| 0012804 | 1/1989 | Japan | 104/281 |

STOPPING ZONES IN A LINEAR MOTOR IN-TRACK TRANSIT SYSTEM

The present invention relates to a transit system and in particular to stopping zones in a linear motor in-track transit system.

Transit systems are well known in the art. Some conventional transit systems implement linear induction motors (LIM's) wherein the LIM primaries are located at spaced intervals between the rails of a track and wherein the LIM secondaries or reaction rails are secured to the undercarriage of vehicles travelling along the track. These transit systems are conventionally designated as LIM in-track transit systems. In these in-track transit systems and as in all transit systems, when more than one vehicles are travelling along the track, it is important to avoid collisions between vehicles. This of course requires the speed of all vehicles travelling along the track to be accurately controlled to ensure that vehicle spacing is maintained. In many systems, to increase vehicle throughput, the vehicles are propelled at high speeds. However, in certain segments of the track such as loading and unloading stations, it is necessary to stop vehicles with high precision. In other sections of the track such as merge locations, it may also be necessary to stop the vehicles to avoid potential vehicular collisions.

In some of the conventional in-track systems, a single linear motor primary in combination with an expensive controller is used in a vehicle stopping zone to stop the vehicles along the track within the stopping zone. Although this type of stopping mechanism typically functions satisfactorily, problems can arise in the event of failure of the LIM primary or controller therefor. This is due to the fact that if the LIM primary or controller fails, the vehicle will pass through the stop zone unimpeded.

The problem of uncontrolled travel of a vehicle due to power failure has been considered by U.S. Pat. No. 4,819,564 to Brandis et al which shows a track installation having a continuous stator disposed between the rails of a track. The track is divided into a plurality of sections with each section having a brake associated therewith. The brakes receive the supply current applied to the stator and remain inoperative as long as current is supplied to the stator. However, when the current supply to the stator is interrupted, the brakes move to an operative position. A vehicle coasting along the track due to a power supply failure will be stopped by one of the brakes as the vehicle passes thereover since the brakes function to engage frictionally the vehicle located within their associated track section. This prevents vehicles from moving uncontrolled along the track in the event of a power failure.

Although this design is satisfactory for stopping vehicles during power system failure, it is not suitable for repeatedly stopping vehicles under normal operating procedures or for stopping vehicles in the event of stator malfunction.

It is therefore an object of the present invention to obviate or mitigate the above disadvantages by providing novel stopping zones in a linear motor intrack transit system.

According to one aspect of the present invention, there is provided a stopping zone in a linear motor in-track transit system, said transit system including a guideway and at least one vehicle moveable along said guideway, said stopping zone comprising:

primary braking means disposed along said guideway and being operable to stop a vehicle entering said stopping zone; and secondary braking means disposed along said guideway and being spaced from said primary braking means, said secondary braking means being conditioned to stop the vehicle upon failure of said primary braking means.

Preferably, the primary braking means is in the form of a linear motor primary having a controller associated therewith, the controller being operable to condition the linear motor primary to provide sufficient reverse thrust to the vehicle entering the stopping zone to stop the vehicle at a designated stopping point.

It is also preferred that the secondary braking means is conditioned to an operative condition in response to outputs signals generated by a position sensor disposed along the guideway downstream from the primary braking means, the position sensor detecting excess travel of the vehicle beyond the designated vehicle stopping point.

In one embodiment, it is preferred that the secondary braking means in the form of a mechanical brake located downstream from the primary braking means, the mechanical brake being responsive to output signals generated by an overshoot sensor. The overshoot sensor provides an enable signal to the mechanical brake when the vehicle is detected as travelling past the desired vehicle stopping point. Preferably, a second linear motor primary is included in the stopping zone and is positioned between the mechanical brake and the first linear motor primary. The second linear motor primary is used to restart vehicles that have been stopped by the mechanical brake.

In another embodiment, it is preferred that the mechanical brake is disposed between the first linear motor primary and the second linear motor primary.

In still yet another embodiment, it is preferred that the primary and secondary braking means are both in the form of first and second linear motor primaries respectively, the second linear primary motor of which is located upstream from the first linear motor primary. In this embodiment, the second linear motor primary is operable to slow a vehicle to a predetermined speed when the vehicle enters the stopping zone. The first linear motor primary is operable to stop the vehicle slowed by the second linear motor primary. However, the second linear motor primary operates to stop the vehicle when the vehicle is detected as travelling beyond the designated stopping point.

The present invention provides advantages in that the provision of two braking mechanisms in each stopping zone insures that vehicles are stopped in the event of failure of the primary brake. Furthermore, since vehicles are stopped in the stopping zone even in the event of failure of one of the brakes, linear motor primaries can be conveniently located for restarting vehicles regardless of which brake is used to stop the vehicle within the stopping zone.

Embodiments of the present invention will now be described by way of example with reference to the accompanying drawings in which.

Figure 1:
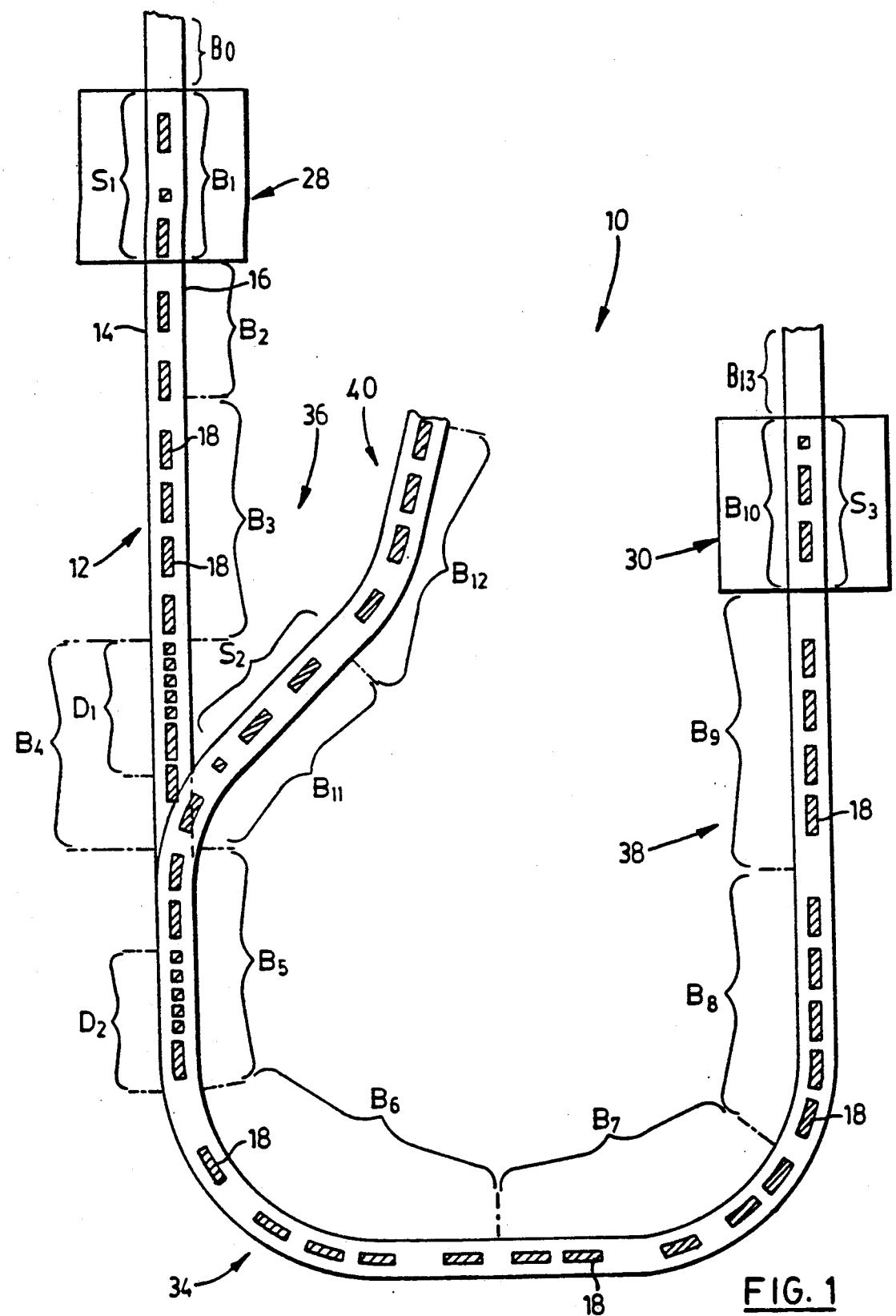
FIG. 1 is a top plan view of a transit system.
Figure 2:
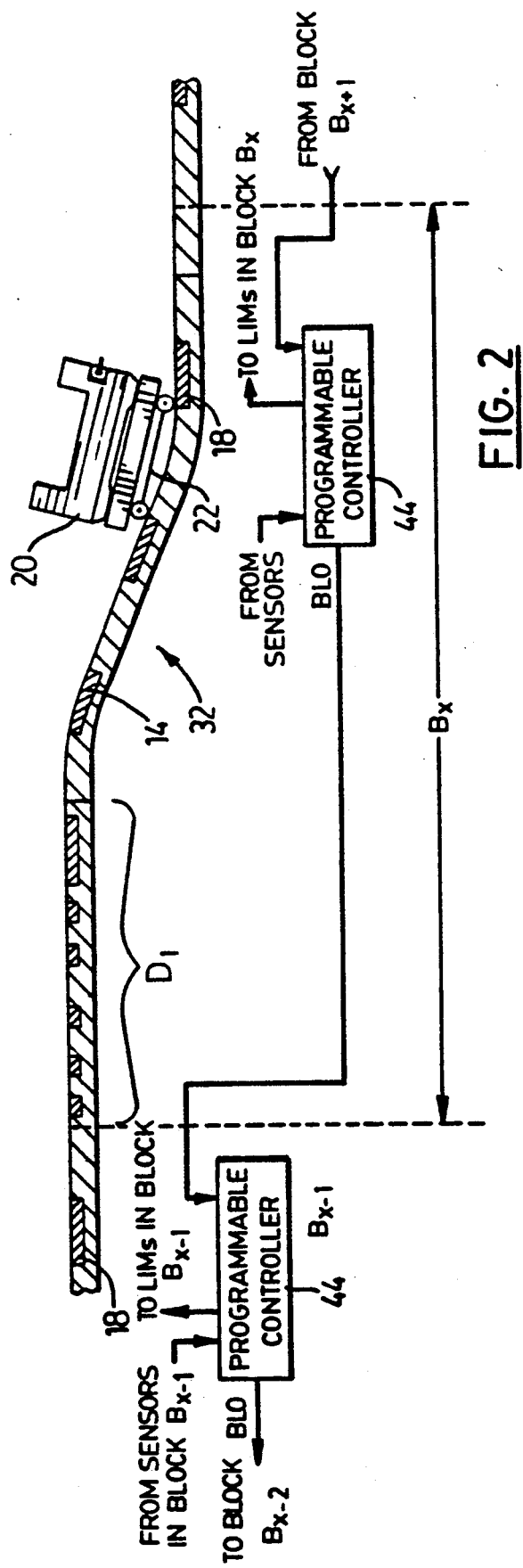
FIG. 2 is a side view of a portion of the transit system shown in FIG. 1.
Figure 7:
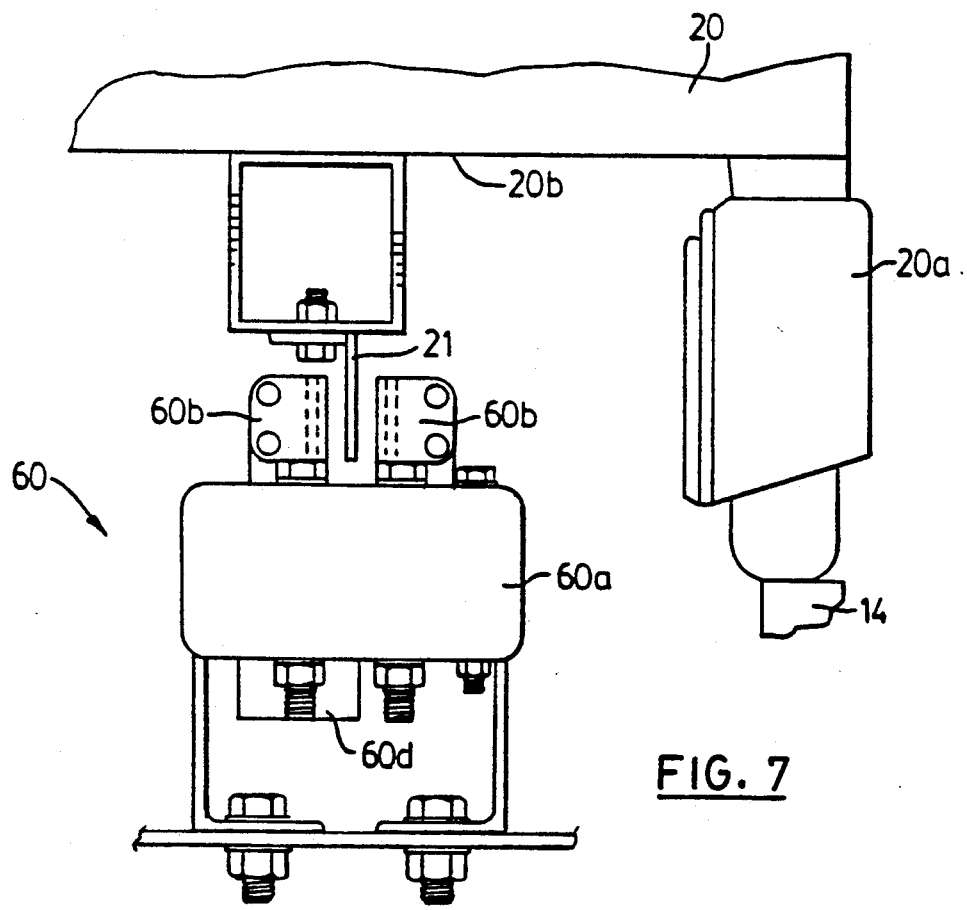
FIG. 7 is an end view of the mechanical brake shown in FIG. 6 together with a portion of a vehicle.

Referring now to FIGS. 1, 2 and 7, a transit system is shown and is generally indicated by reference numeral 10. The transit system 10 includes a track 12 having a pair of rails 14,16. Linear induction motor (LIM) primaries 18 are located between the rails of the track 12 at spaced intervals. Freight-carrying vehicles 20 have their axle sets 20a supported by the track 12 and are moveable therealong. As best seen in FIG. 7, each vehicle 20 has a brake rail 21 extending along the length of the vehicle that is secured to its chassis 20b. The brake rail 21 is in the form of a flange and is positioned adjacent one side of the vehicle. Each vehicle 20 also includes a reaction rail 22 or LIM secondary secured to its chassis 20b which cooperates with the linear induction motor primaries 18 in a known manner to propel the vehicles 20. Since the operation of linear induction motors is well known to those of skill in the art, a detailed description thereof will not be discussed herein.

As can be seen, the track 12 extends between a manual freight loading station 28 and an automatic freight unloading station 30. The majority of the track 12 extending between the two stations 28, 30 is generally horizontal and straight. These sections of the track are designated by reference numerals 36 and 38 and are sections of the track where vehicles are propelled at high speeds to increase vehicle throughput. However, the track also experiences a downgrade 32 (best seen in FIG. 2) and a curve 34 (best seen in FIG. 1) along a portion of its length. Deceleration zones $D_1$ and $D_2$ are designated along portions of the track 12 adjacent the vehicle entrance end of the downgrade 32 and the vehicle entrance end of the curve 34 respectively. The deceleration zones $D_1$ and $D_2$ function to slow vehicles 20 travelling along the track between the stations 28, 30 to a desired speed before the vehicles leave the deceleration zones and enter the following sections of track.

A merging section of track 40 intersects the main track 12 at a location adjacent the bottom of the downgrade 32. Similarly, the merging section of track 40 has linear induction motor primaries 18 disposed between the rails thereof at spaced intervals to propel vehicles 20.

Vehicle stopping zones $S_1$ and $S_3$ are designated along the track 12 in the loading and unloading stations 28,30 respectively and function to stop the vehicles 20 at the stations so that freight can be placed on the vehicles and removed therefrom. A stopping zone $S_2$ is also designated along a section of the merge track 40 so that vehicles travelling therealong are automatically stopped before entering the main section of track 12. The stopping zones $S_1$, $S_2$, and $S_3$ include a primary brake and a secondary brake, each brake of which is operable to stop a vehicle entering the stopping zone. However, the secondary brake remains in an inoperative condition unless the vehicle 20 has been detected as passing the desired stopping point in the stopping zone due to failure of the primary brake, the details of which will be described herein.

To increase throughput in the transit system 10, it is desired to move the vehicles 20 along the track 12 between the loading and unloading stations 28,30 respectively as fast as possible with accurate control to avoid high speed collisions. This collision avoidance is achieved by dividing the track into fixed segments or blocks $B_1$ to $B_{12}$. When a vehicle 20 is detected as being present in a block $B_x$ by sensors positioned along the track, a block occupied signal BLO is generated by a controller 44 in the block $B_x$ and is applied to the controller 44 in the previous block $B_{x-1}$. If a vehicle enters the previous block $B_{x-1}$ while the controller 44 therein is receiving the block occupied signal BLO from the adjacent upstream block $B_x$, the LIM primaries 18 in the block $B_{x-1}$ are operated by the controller 44 in a manner to cause the vehicle 20 to be stopped within the block $B_{x-1}$. This prevents two vehicles from being located within the same block and thus, avoids collisions between vehicles and maintains vehicle spacing. This operation is achieved by ensuring that the length of each block $B_x$ is sufficient to stop a vehicle completely or at least to slow a vehicle to a speed such that even if the vehicles collide in the block $B_x$, the impact resulting from the collision can be withstood by the vehicles without any resulting damage.

Figure 3:
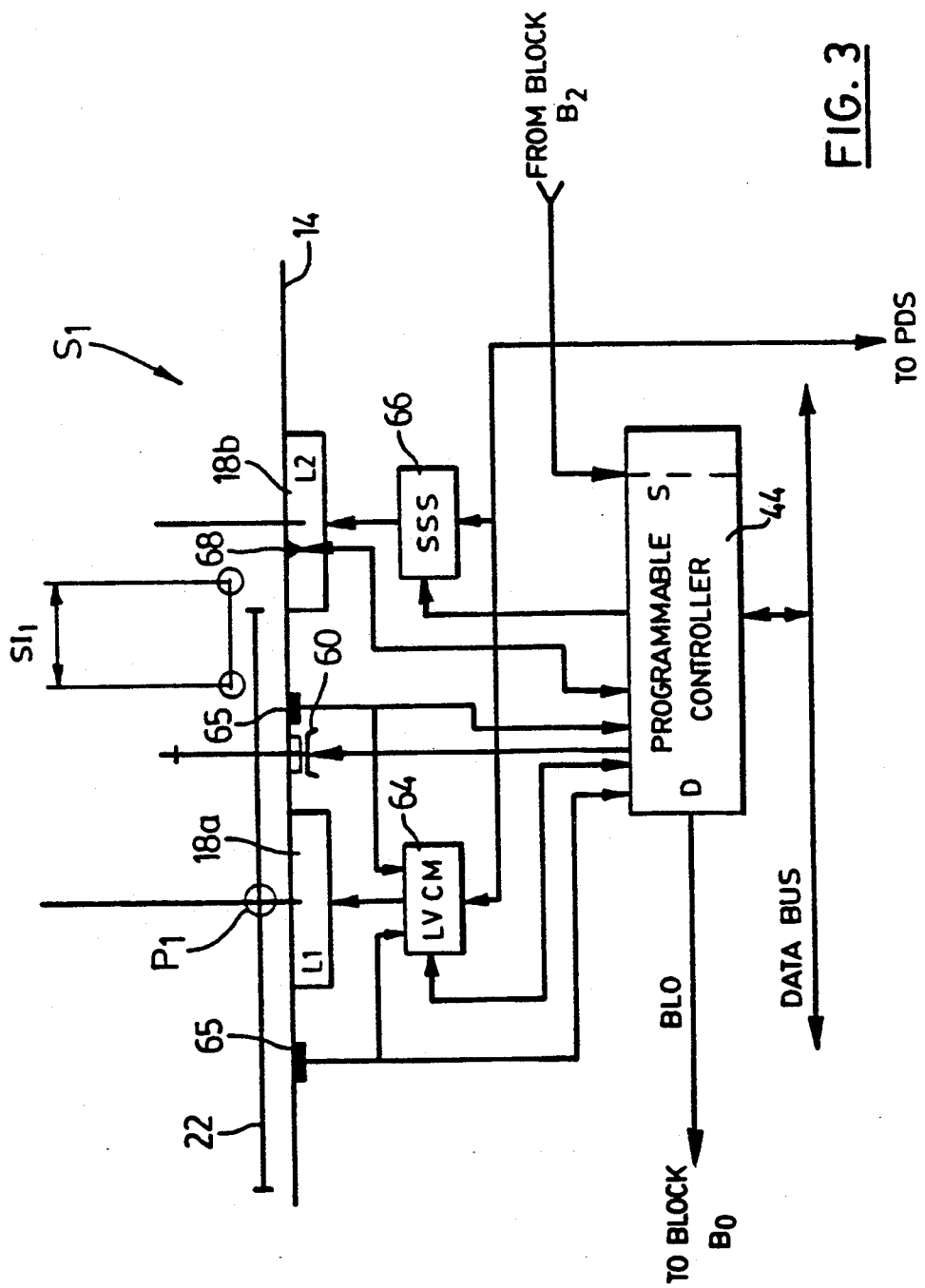
FIG. 3 is a side view of a stopping zone in the transit system shown in FIG. 1.
Figure 6:
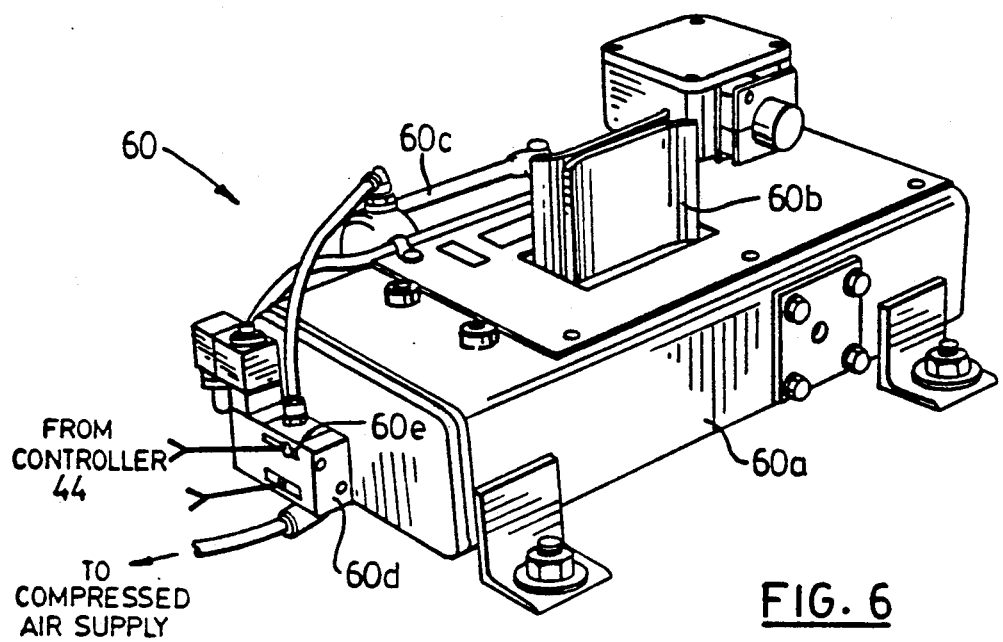
FIG. 6 is a perspective view of a mechanical brake used in the stopping zones shown in FIGS. 3, 4 and 5.

Referring now to FIGS. 3, 6 and 7, the stopping zone $S_1$ in the manual loading station 28 is better illustrated. As can be seen, the stopping zone $S_1$ includes two spaced linear induction motor primaries 18a,18b disposed between the rails of the track 12. The LIM primaries 18a,18b are positioned in a manner so that the reaction rail 22 secured to a vehicle 20 extends over both LIM primaries at certain positions in the stopping zone. A mechanical wayside "fail-safe" brake assembly 60 (best illustrated in FIG. 6) is also disposed along the track 12 within the stopping zone $S_1$ and is positioned between the two LIM primaries 18a,18b respectively. The brake assembly 60 includes a housing 60a in which an air actuated drive (not shown) is contained. A pair of spaced brake clamps 60b project upwardly through an opening in the housing 60a and are biased towards one another by four coil springs located within the housing. An air cylinder 60c connected to a suitably compressed air supply is operable to actuate a drive within the housing by supplying compressed air thereto upon actuation of a solenoid 60d mounted on the housing. The drive in turn reverse biases the springs to move the brake clamps 60b apart and thus, release the brake assembly 60. An exhaust valve 60e is also provided to decompress the air cylinder 60c so that brake clamps 60b spring back to the closed position when desired. The brake clamps 60b are operable to engage the brake rail 21 secured to the chassis of the vehicles 20 in the transit system 10 when moved to the closed position. Typically, the brake clamps are maintained in the open position but are returned to the closed position when required. This design is preferred in that the brake clamps automatically move to the closed position upon power failure or failure of the compressed air supply.

The LIM primary 18a is controlled by a linear voltage control module (LVCM) 64 which is capable of connecting the LIM primary 18a to a power distribution system PDS in a manner so that the LIM primary supplies thrust to the vehicles having a desired magnitude and direction. Details of the operation of the LVCM 64 are described in U.S. patent application entitled "Velocity and Position Controller" assigned to the Assignee of the present application which was filed on Dec. 29, 1989 and issued Ser. No. 456,799. LVCM sensors 65 are positioned along the track on opposite sides of the LIM primary 18a and communicate with the LVCM 64 so that the position and speed of the vehicle in the stopping zone $S_1$ can be determined by the LVCM.

The other LIM primary 18b is controlled by a synchronous speed starter (SSS) 66 which is operable to connect the LIM primary 18b to the positive phase sequence of the power distribution system PDS at full voltage. Thus, the LIM primary 18b is only capable of supplying a predetermined forward thrust to a vehicle 20 located within the control zone of the LIM primary 18b. An overshoot sensor 68 in the form of a proximity switch is positioned along the track 12 adjacent the LIM primary 18b and is operable to detect travel of a vehicle beyond a designated stopping point $P_1$ within the stopping zone $S_1$. The sensor 68 and the LVCM sensors 65 are arranged so that at least one of the sensors always detects the presence of a vehicle located within the stopping zone $S_1$. The sensors 65,68 are in communication with a programmable controller 44 and provide signals thereto upon detection of a vehicle 20. The controller 44 is also in communication with the LVCM 64, the solenoid 60d of the brake assembly 60, the synchronous speed starter 66 and the programmable controller 44 in the adjacent downstream section $B_2$ of the track 12. The programmable controller 44 is also in communication with the programmable controller 44 in the adjacent upstream section $B_0$ of the track 12 and provides a signal BLO thereto when a vehicle is located within the stopping zone $S_1$. This signal is used by the upstream programmable controller 44 to prevent another vehicle from entering the stopping zone $S_1$ when it is already occupied by a vehicle 20.

Figure 4:
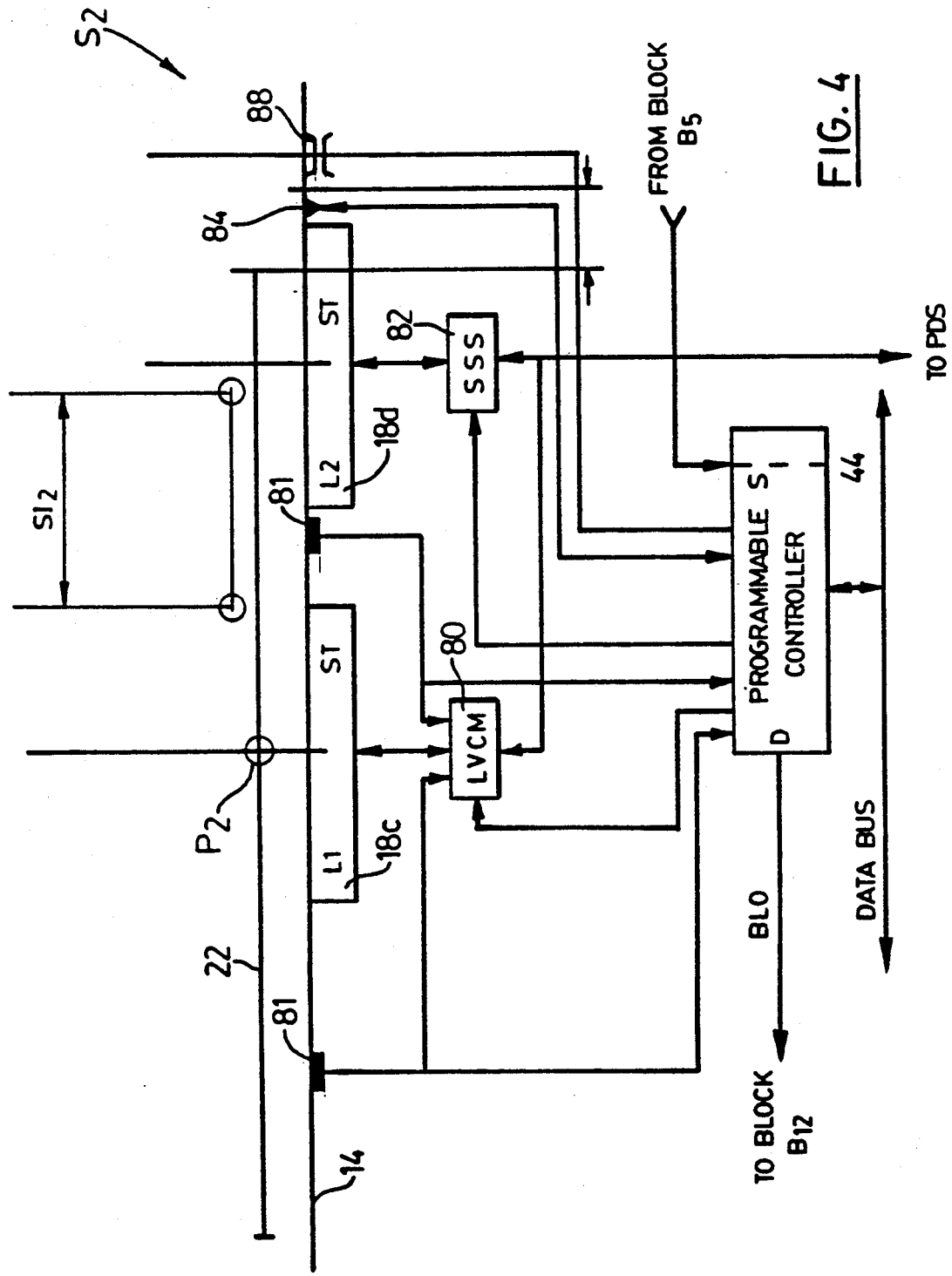
FIG. 4 is a side view of another stopping zone in the transit system shown in FIG. 1.

FIG. 4 shows the low speed stopping zone $S_2$ located at the intersection formed between the merge section 40 and the main section of track 12. As mentioned previously, the stopping zone $S_2$ functions to stop vehicles 20 prior to vehicles merging onto the main section of the track 12. As can be seen, the stopping zone $S_2$ also includes a pair of spaced LIM primaries 18c,18d disposed between the rails of the track. An LVCM 80 is operable to connect one of the LIM primaries 18c to the power distribution system PDS while a synchronous speed starter 82 is operable to connect the other LIM primary 18d to the power distribution system. LVCM sensors 81 in communication with the LVCM 80 are positioned between the rails of the track on opposite sides of the LVCM 80. An overshoot sensor 84 is located along the track downstream of the second LIM primary 18d and detects excess travel of a vehicle 20 beyond a designated stopping point $P_2$ within the stopping zone $S_2$. The overshoot sensor 84 and the LVCM sensors 81 are in communication with a programmable controller 44 and are spaced along the track in a manner so that at least one of the sensors always detects the presence of a vehicle in the stopping zone.

Another brake assembly 88 identical to brake assembly 60 is located along the track 12 slightly downstream from the overshoot sensor 84. The brake assembly 88 is similarly operable to engage frictionally the brake rail 21 secured to a vehicle to stop the vehicle. The solenoid of the brake assembly 88 is also in communication with the programmable controller 44. The programmable controller 44 is also in communication with the programmable controllers 44 located in the adjacent upstream and downstream segments of track, with the LVCM 80 and with the synchronous speed starter 82.

Figure 5:
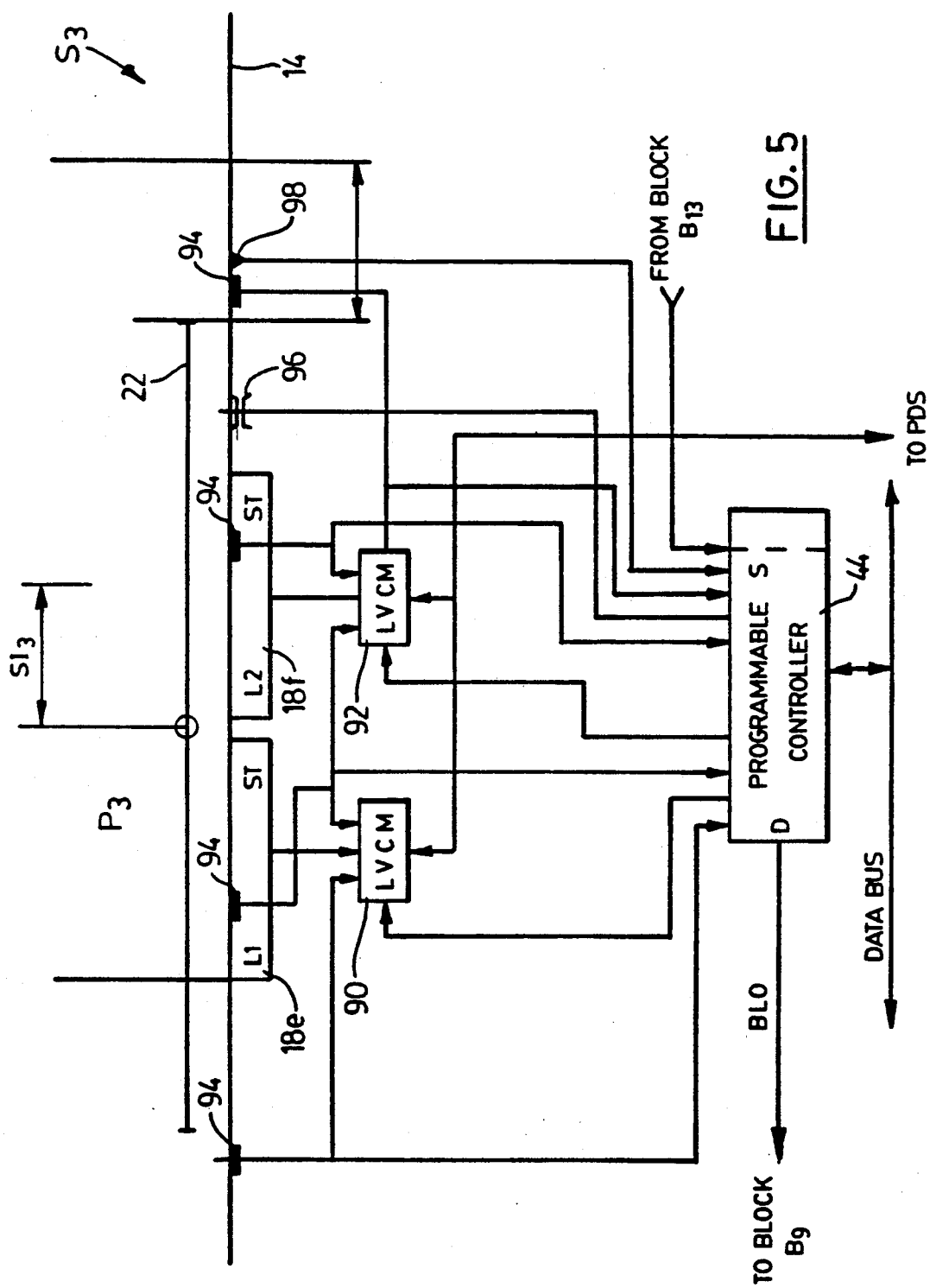
FIG. 5 is a side view of still yet another stopping zone in the transit system shown in FIG. 1.

FIG. 5 illustrates the high precision stopping zone $S_3$ used in the automatic freight unloading station 30. The stopping zone $S_3$ includes a pair of spaced LIM primaries 18e,18f located between the rails of the track 12, each of which is controlled by an LVCM 90,92 respectively. A plurality of LVCM sensors 94 are located along the track 12 at spaced intervals and communicate with the LVCMs 90,92. The sensors are located along the track 12 in a manner so that any vehicle located within the stopping zone $S_3$ is always detected by at least one sensor. Similar to the other stopping zones, the LVCMs 90,92 are operable to connect the LIM primaries 18e,18f to the power distribution system PDS. A brake assembly 96 identical to the brake assembly 60 is located downstream from the LIM primary 18f and is operable to engage fictionally the brake rail 21 secured to the chassis of the vehicles 20. An overshoot detector 98 in the form of a proximity switch is located downstream from the brake assembly 96 and communicates with a programmable controller 44. The programmable controller 44 also communicates with the brake assembly 96, the two LVCM's 90,92 and the LVCM sensors 94 to effect high precision stopping of vehicles at a designated stopping point $P_3$ in the stopping zone $S_3$ as will be described. The programmable controller 44 also communicates with the programmable controllers 44 in the in adjacent upstream and downstream sections of the track 12.

The operation of the transit system 10 will now be described with particular emphasis on the operation of the stopping zones. In operation, when a vehicle 20 enters the loading station 28, it is desired to stop the vehicle so that freight can be placed thereon. In this instance, since the loading of freight is performed manually, high precision stopping of the vehicle in the stopping zone at the designated stopping point $P_1$ is not critical, since small variations in the stopping point can be tolerated by personnel. When the vehicle 20 enters the stopping zone $S_1$, the LVCM sensors 65 detect the presence of the vehicle and supply signals to the LVCM 64 and to the programmable controller 44. Since the sensors 65 are arranged so that a vehicle 20 within the stopping zone $S_1$ is always detected by at least one sensor, the controller 44 always receives a signal from at least one sensor when a vehicle is present in the stopping zone. The controller 44 in response to the signals received from the sensors, generates a BLO signal which is conveyed to the controller 44 in the previous section $B_0$ of track 12. The BLO signal is used by the upstream controller 44 to inhibit another vehicle 20 from entering the stopping zone $S_1$ when it is already occupied by a vehicle. When the LVCM 64 receives the signals generated by the sensors 65, the LVCM 64 calculates the speed of the vehicle and in turn connects the linear induction motor primary 18a to the power distribution system PDS in a manner so that the LIM primary 18a supplies a reverse thrust to the vehicle to bring the vehicle to a stop with its centre over the designated stopping point $P_1$.

Once the vehicle 20 has been stopped, an output signal is generated by the LVCM 64 and conveyed to the programmable controller 44. The controller 44 in turn disables the LVCM 64 to prevent the LIM primary 18a from being energized and enables the brake assembly 60 by supplying a conditioning signal to the solenoid 60d and to the exhaust valve 60e. When this occurs, the solenoid triggers to disconnect the air cylinder 60c from the compressed air supply and to release the air pressure within the drive. This causes the drive to release so that the springs move the brake clamps 60b together so that they clamp onto the brake rail 21 secured to the vehicle 20. This prevents the chassis of the vehicle 20 from rolling during loading. At this time, the vehicle 20 can be manually loaded with freight.

Once the vehicle 20 has been loaded with freight, a signal is provided to the controller 44 by the operating personnel. The controller 44 in turn energizes the brake assembly 60 by activating the solenoid 60d allowing the air cylinder 60c to supply compressed air to the drive. This causes the drive to reverse bias the springs so that the brake clamps 60b move apart and disengage the brake rail 21. Once this has been done, the controller 44 enables the LVCM 64 if a block occupied signal BLO is not being received by the programmable controller 44 from the downstream block $B_2$. When the LVCM 64 is enabled, the LVCM connects the LIM primary 18a to the power distribution system PDS so that the LIM primary supplies a propulsive force to the vehicle 20 causing the vehicle to leave the stopping zone $S_1$ and enter the next segment $B_2$ of track on its way to the unloading station 30. Once the vehicle 20 leaves the stopping zone $S_1$, the output of the sensors therein goes low thereby causing the programmable controller 44 to remove the BLO signal applied to the upstream controller 44. This allows the upstream controller to direct another vehicle 20 into the stopping zone $S_1$.

During normal operation, the LIM primary 18a operates to stop the vehicle 20 at the designated stopping point $P_1$ and the vehicle does not trigger the brake engage sensor 68. However, since the sensor 68 is located slightly downstream from the typical stopping point $P_1$ of the leading edge of the reaction rail 22, some overshoot past the designated stopping point by the vehicle 20 is permitted in typical operation without activating any secondary braking mechanism. If overshoot occurs and the reaction rail 22 lies in the control zone of both LIM primaries 18a,18b without triggering the sensor 68, the programmable controller 44 enables the LVCM 64 and the synchronous speed starter 66 so that both LIM primaries are used to restart the vehicle 20 after the brake assembly 60 has been released.

However, if the LIM primary 18a or LVCM 64 completely fail or malfunction and the vehicle 20 is not stopped within the tolerated overshoot interval, the sensor 68 detects the presence of the reaction rail 22 secured to the vehicle 20 and supplies a signal to the controller 44. When this occurs, the controller 44 disables the LVCM 64 and activates the brake assembly 60 in the same manner previously described. The brake assembly 60 in turn operates to engage frictionally the brake rail 21 secured to the vehicle 20 causing the vehicle to stop with its centre located within the stopping interval $SI_1$. This operation minimizes vehicle overshoot past the designated stopping point $P_1$. The exact stopping point of the vehicle within the stopping interval $SI_1$ is of course dependant on the speed and mass of the vehicle when it passes over the sensor 68. Once the vehicle has been stopped by the brake assembly 60, the vehicle 20 can be loaded with freight. Once loaded, a signal is supplied to the programmable controller 44 by the operating personnel. The controller 44 in turn energizes the brake assembly 60 in the manner described previously and operates the synchronous speed starter 66. Once operated, the solid state switch 66 connects the LIM primary 18b to the positive phase sequence of the power distribution system PDS at full voltage so that the LIM primary 18b supplies a predetermined forward thrust to the vehicle 20 causing the vehicle to leave the stopping zone $S_1$ and enter the following segment $B_2$ of track 12.

After the vehicle has left the stopping zone $S_1$, the LIM primaries 18 in each block $B_x$ are successively operated to propel the vehicle 20 along the track towards the unloading station 30 in a manner to avoid collisions by ensuring that only one vehicle is located within each block. When the vehicle enters the unloading station 30, the high precision stopping zone $S_3$ is effected to bring the vehicle 20 to a stop so that the centre of the vehicle overlies the designated stopping point $P_3$. This allows the automated freight unloading equipment to unload the vehicle.

In particular, as the vehicle 20 enters the stopping zone $S_3$, the first LVCM sensor 94 detects the presence of the vehicle 20 and provides signals to the LVCM 90 and to the controller 44. The LVCM 90 in turn connects the LIM primary 18e to the power distribution system PDS in a manner to cause the LIM primary 18e to provide a reverse thrust to the vehicle 20 so that the vehicle is slowed to a desired speed but not stopped. At the same time, the controller 44 generates a BLO signal in response to the signals received from the sensors 94 and conveys the BLO signal to the upstream block $B_9$. This prevents another vehicle from entering the stopping zone $S_3$ while it is occupied by a vehicle. Once this occurs and the vehicle is detected as passing over the second LVCM sensor 94, the sensor 94 provides a signal to the controller 44 which in turn disables the LVCM 90 and enables the other LVCM 92. Once enabled, the LVCM 92 connects the LIM primary 18f to the power distribution system PDS in a manner so that the LIM primary 18f applies a reverse thrust to the vehicle 20 causing the vehicle to stop with its centre over the designated stopping point $P_3$. Since the speed of the vehicle 20 is reduced substantially prior to entering the control zone of the second LIM primary 18f, precision stopping of the vehicle at the stopping point $P_3$ is permitted while reducing the maximum current drawn from the power distribution system PDS by the LIM primaries 18e and 18f respectively.

Once the vehicle 20 has been stopped, a signal is conveyed to the controller 44 by the LVCM 92. The controller 44 in response to the signal disables the LVCM 92 and enables the brake assembly 96 in the same manner as described so that the brake assembly 60 inhibits any further movement of the vehicle 20. At this time, the automatic freight removal equipment is operated. Once the freight has been removed from the vehicle, a signal is applied to the controller 44 from the freight removal equipment. The controller 44 in turn disengages the brake assembly 96 in the same manner as described for brake assembly 60 and enables the LVCM 90 so that the first LIM primary 18e can be operated to restart the vehicle provided the following section of the track 12 is not occupied by another vehicle 20. If the last LVCM sensor 94 detects the presence of the vehicle without the overshoot sensor 98 being triggered, the controller 44 enables both LVCM's 90,92 so that both LIM primaries 18e,18f are used to restart the vehicle 20 provided the following section of the track 12 is not occupied by another vehicle 20.

If the LVCM 90 or LIM primary 18e fails so that the vehicle 20 is not slowed by the LIM primary 18e, the excess speed of the vehicle is detected by the LVCM 92 using the output signals generated by the sensors 94. The LVCM 92 in turn connects the second LIM primary 18f to the power distribution system PDS in a manner so that the vehicle is still stopped with its centre over the designated stopping point $P_3$ without the vehicle passing over the overshoot sensor 98. Once the vehicle 20 has been stopped, the LVCM 92 is disengaged by the controller 44 and the brake assembly 96 is engaged to permit freight removal. After this occurs, the brake assembly 96 is connected to the compressed air supply and the LVCM 92 is engaged by the controller 44 so that the LIM primary 18f can be operated to restart the vehicle provided the following section of the track 12 is not occupied by another vehicle 20.

In the event that the second LIM primary 18f or LVCM 92 fails after the first LIM primary 18e has slowed the vehicle 20, the excess travel of the vehicle beyond the designated stopping point $P_3$ is detected via the overshoot sensor 98. When this occurs, the sensor output is conveyed to the controller 44 which in turn enables the LVCM 90. The LVCM 90 in turn connects the LIM primary 18e to the power distribution system PDS so that the necessary reverse thrust is applied to the vehicle 20 thereby bringing the vehicle to a stop with the centre of the vehicle lying within a stopping interval $SI_3$. When this occurs, the LVCM 90 continues to operate the LIM primary 18e so that the vehicle reverses direction and is stopped with its centre over the stopping point $P_3$. After this, the controller 44 disengages the LVCM 90 and enables the brake assembly 96 to inhibit any further movement of the vehicle 20 and to allow the freight to be removed from the vehicle. Following this, the controller 44 disables the brake assembly 96 and engages the LVCM 90 to permit restarting of the vehicle provided the following section of the track 12 is not occupied by another vehicle 20.

The stopping zone $S_2$ is included in the transit system 10 to stop all vehicles before they enter the main section of the track 12 from the merge section 40 of track. When a vehicle 20 enters the stopping zone $S_2$, the presence of the vehicle is detected by at least one LVCM sensor 81. The sensors 81 in turn provide signals to the LVCM 80 as well as to the controller 44 when they detect the presence of a vehicle 20. The LVCM 80 in turn connects the LIM primary 18c to the power distribution system PDS so that a reverse thrust is applied to the vehicle 20 causing the vehicle 20 to stop with its centre over the designated stopping point $P_2$. At the same time, the controller 44 enables the brake assembly 88 in the same manner as described for brake assembly 60 to a closed position and provides a BLO signal to the block $B_{12}$ to prevent another vehicle from entering the stopping zone while it is occupied. In normal operation, the LVCM 80 and LIM primary 18c operate to stop the vehicle 20 at a designated stopping point $P_2$ before it reaches the brake assembly 88 and thus, the brake assembly 88 although operated to close the brake clamps does not engage the brake rail 21 of the vehicle and thus, effectively remains inoperative. After the vehicle 20 has stopped, a signal is conveyed to the programmable controller 44 by the LVCM 80 causing the controller 44 to energize the brake assembly 88 and thereby separate the brake clamps. Thereafter, the LVCM 80 operates the LIM primary 18c to restart the vehicle provided the following section of track is clear. If the following section of track is occupied, the controller 44 operates in the same manner as in the other stopping zones and inhibits the LVCM 80 from operating until the track becomes clear.

If the LIM primary 18c or LVCM 80 fail and the vehicle 20 travels beyond the designated stopping point $P_2$, the brake assembly 88 engages the brake rail 21 secured to the vehicle 20 causing it to stop with its centre lying within a stopping interval $SI_2$. When this occurs, the overshoot sensor 84 detects the presence of the vehicle and provides signals to the controller 44. The controller 44 in turn disables the LVCM 80 to prevent the LIM primary 18c from generating thrust against the braking force of the brake assembly 88.

Once the vehicle 20 has been stopped by the brake assembly 88 and the following section of the track is detected as being clear, the brake assembly 88 is energized by the controller 44 to release the brake clamps. Thereafter, the synchronous speed starter 82 is enabled by the controller 44 so that the second LIM primary 18d restarts the vehicle. With the vehicle 20 restarted, the vehicle enters the main segment of track 12 and proceeds to the unloading station 30.

As should be apparent, the present stopping zones provide advantages in that the redundant braking schemes provided therein ensure that a vehicle is stopped within the stopping zone in the event of failure or malfunction of the primary brake. Furthermore, the arrangement of the sensors and the additional LIM primaries permits the secondary brakes to operate timely to reduce vehicle overshoot past the designated stopping points in the stopping zones and to facilitate restarting of the vehicles once they have been stopped.

We claim:

1. A stopping zone in a linear motor in-track transit system, said transit system including a guideway and at least one vehicle carrying a linear motor secondary moveable along said guideway, said stopping zone comprising:

primary braking means in the form of a first linear motor primary disposed along said guideway, said first linear motor primary being operable to supply a reverse thrust to a vehicle entering said stopping zone, said reverse thrust being sufficient to stop a vehicle at a designated stopping point within said stopping zone, said first linear motor primary also being operable to restart a vehicle stopped thereby;

secondary braking means in the form of a mechanical brake disposed along said guideway downstream of said first linear motor primary, said mechanical brake being conditioned to engage frictionally a portion of said vehicle to stop said vehicle within said stopping zone upon failure of said first linear motor primary; and restart means disposed along said guideway adjacent said mechanical brake, said restart means being operable to restart a vehicle stopped by said mechanical brake.

2. A stopping zone as defined in claim 1 wherein said restart means is in the form of a second linear motor primary.

3. A stopping zone as defined in claim 2 further comprising control means in communication with said first and second linear motor primaries; and vehicle sensing means disposed along said guideway adjacent said secondary braking means for detecting travel of said vehicle beyond said designated stopping point, said control means disabling said first linear motor primary upon detection of said vehicle by said sensing means.

4. A stopping zone as defined in claim 1 wherein said mechanical brake is positioned along said guideway between said first linear motor primary and said restart means, said mechanical brake being actuable between inoperative and operative conditions, said mechanical brake remaining in said inoperative condition and being actuable to said operative condition upon detection of a vehicle entering said stopping zone.

5. A stopping zone as defined in claim 4 further comprising control means in communication with said first linear motor primary and said mechanical brake; and
vehicle sensing means disposed along said guideway adjacent said restart means for detecting travel of said vehicle beyond said designated stopping point, said control means actuating said mechanical brake to said operative condition upon detection of a vehicle entering said stopping zone and further disabling said first linear motor primary upon detection of said vehicle by said vehicle sensing means.

6. A stopping zone as defined in claim 5 wherein said restart means is in the form of a second linear motor primary, said control means actuating said mechanical brake to said inoperative condition and enabling said second linear motor primary to restart a vehicle after a vehicle has been stopped by said mechanical brake.

7. A stopping zone as defined in claim 1 wherein said mechanical brake is positioned along said guideway downstream from said restart means, said mechanical brake being actuable between inoperative and operative conditions, said mechanical brake remaining in said inoperative condition and being actuable to said operative condition upon detection of a vehicle travelling beyond said designated stopping point.

8. A stopping zone as defined in claim 7 further comprising control means in communication with said first linear motor primary and said mechanical brake; and
vehicle sensing means disposed along said guideway adjacent said mechanical brake for detecting travel of said vehicle beyond said designated stopping point, said control means actuating said mechanical brake to said operative condition upon detection of a vehicle by said vehicle sensing means.

9. A stopping zone as defined in claim 8 wherein said control means further disables said first linear motor primary upon actuation of said mechanical brake to said operative condition.

10. A stopping zone as defined in claim 9 wherein said vehicle sensing means is positioned between said restart means and said mechanical brake and wherein said restart means is in the form of a second linear motor primary.

11. A stopping zone as defined in claim 10 wherein said control means actuates said mechanical brake to said inoperative condition and enables said second linear motor primary to restart a vehicle after a vehicle has been stopped by said mechanical brake.

12. A stopping zone as defined in claim 11 wherein said first and second linear motor primaries are spaced along said guideway in a manner so that said linear motor secondary secured to said vehicle extends over both of said linear motor primaries at least at one position within said stopping zone, said one position being located upstream from said vehicle sensing means and wherein said control means enables said first and second linear motor primaries to restart said vehicle when said first linear motor primary stops said vehicle in said one position.

13. A stopping zone as defined in claim 8 wherein said control means disables said first linear motor primary and actuates said mechanical brake to said operative condition upon stopping of a vehicle by said first linear motor primary and actuates said mechanical brake to said inoperative condition and enables said first linear motor primary when it is desired to restart said vehicle.

14. A stopping zone in a linear motor in-track transit system, said transit system including a guideway and at least one vehicle carrying a linear motor secondary moveable along said guideway, said stopping zone comprising:
primary braking means in the form of a first linear motor primary disposed along said guideway and being operable to supply a reverse thrust to a vehicle entering said stopping zone, said reverse thrust being sufficient to stop said vehicle at a designated stopping point within said stopping zone; and
secondary braking means in the form of a second linear motor primary disposed along said guideway upstream of said first linear motor primary, said first and second linear motor primaries being sufficiently close and the linear motor secondary carried by said at least one vehicle being of sufficient length so that a portion of said linear motor secondary sufficient to effect the stopping of said vehicle is disposed within a control zone of said second linear motor primary upon detection of said vehicle passing said designated stopping point within said stopping zone, and said second linear motor primary being conditioned to supply a reverse thrust sufficient to stop said vehicle upon detection of said vehicle passing said designated stopping point.

15. A stopping zone as defined in claim 14 wherein said second linear motor primary is operable to slow a vehicle entering said stopping zone to a predetermined speed and is conditioned to stop said vehicle upon detection of said vehicle travelling beyond said designated stopping point.

16. A stopping zone as defined in claim 15 further comprising control means in communication with said first and second linear motor primaries, said control means enabling said first and second linear motor primaries upon detection of a vehicle within said stopping zone.

17. A stopping zone as defined in claim 16 wherein said control means disables said second linear motor primary and enables said second linear motor primary to stop said vehicle upon detection of said vehicle travelling beyond said designated stopping point.

18. A stopping zone as defined in claim 17 further comprising vehicle holding means disposed along said guideway downstream from said first linear motor primary, said control means disabling said first and second linear motor primaries and enabling said holding means upon stopping of said vehicle in said stopping zone, said control means disabling said holding means and re-enabling said first and second linear motor primaries when it is desired to restart said vehicle.

19. A stopping zone as defined in claim 18 further comprising a vehicle overshoot sensor disposed along said guideway downstream from said holding means, said sensor being in communication with said control means and detecting travel of said vehicle beyond said designated stopping point.

20. A stopping zone as defined in claim 19 wherein said holding means is in the form of a mechanical brake.

* * * * *